Jan. 25, 1955  N. F. ANDREWS  2,700,262
CONVEYER CLUTCH CONTROL FOR HARVESTERS
Filed Aug. 4, 1952  3 Sheets-Sheet 1

INVENTOR.
N. F. ANDREWS
ATTORNEYS

Jan. 25, 1955   N. F. ANDREWS   2,700,262
CONVEYER CLUTCH CONTROL FOR HARVESTERS

Filed Aug. 4, 1952   3 Sheets-Sheet 3

INVENTOR.
N. F. ANDREWS
BY
ATTORNEYS

United States Patent Office
2,700,262
Patented Jan. 25, 1955

2,700,262

CONVEYER CLUTCH CONTROL FOR HARVESTERS

Norman F. Andrews, Ankeny, Iowa, assignor to Deere Manufacturing Co., Dubuque, Iowa, a corporation of Iowa Application August 4, 1952, Serial No. 302,572

9 Claims. (Cl. 56—15)

This invention relates to a harvesting machine and more particularly to a clutch for controlling the drive between the harvesting machine and an elevator associated therewith.

A typical machine of the character referred to is the conventional corn harvester. Such machine normally comprises either a tractor-carried or tractor-drawn corn picker having gathering means for gathering ears of corn from standing stalks and conveying these ears rearwardly to a hopper associated with a wagon elevator. The wagon elevator inclines upwardly and rearwardly to deliver the ears to a wagon towed by the corn picker. The connection of the wagon to the picker is effected by a pivot on a vertical axis, so that when the picker reaches the end of a row or is otherwise steered to negotiate a relatively sharp turn, the wagon elevator will swing laterally so that its discharge end is no longer in alinement with the trailer or wagon. If provision is not made for disconnecting the drive to the wagon elevator, ears conveyed by the elevator will be delivered to the ground rather than to the wagon. It is known, of course, to utilize a manual control with a clutch in the wagon elevator drive for accomplishing disconnection of the wagon elevator clutch in circumstances such as those referred to. However, the addition of a manual control imposes further burden on the picker operator.

According to the present invention, the wagon elevator clutch control is coordinated with power means, and preferably with power means used to raise and lower or otherwise adjust the gathering or picking unit. Normally, the operator will activate the power means to raise the picker when the machine reaches the end of a row, so that the machine may be turned about to return along one or more adjacent rows. When the picker is centered on the adjacent row or rows, the gathering unit may be lowered. Conventionally, an arrangement such as this is known, but the primary defect is that the wagon elevator clutch is immediately reengaged and more often than not the reengagement precedes proper alinement of the wagon elevator discharge spout and the wagon or trailer, with the result that ears are lost. It is a specific object of the present invention to utilize coordinating means between power control means and manual control means so that the wagon elevator clutch is disengaged when the picking unit is raised but reengagement of the wagon elevator clutch is delayed so that the wagon or trailer may come about in proper trailing relationship to the picker and wagon elevator. It is a feature of the invention to provide the wagon elevator clutch control means as a pair of force-transmitting means connected in parallel, one to the power-operated means and the other to a manually operated means, with provision being made in the form of a lost-motion device, so that the power-operated means may be utilized to raise and lower the picker without affecting the wagon elevator clutch, depending upon the position of the manually operated means. It is a further feature of the invention to provide a simple and inexpensive control that may be produced as an attachment for harvesters of existing types.

The foregoing and other important objects and desirable features inherent in and encompassed by the invention will appear as a disclosure of a preferred embodiment of the invention is made in the following detailed description and accompanying sheets of drawings in which Figure 1 is a side elevational view, partly in section, of a tractor-mounted corn picker embodying the invention, portions of the gathering unit being broken away to illustrate the mounting of the picker on the tractor and the discharge end of the wagon elevator and the wagon itself being omitted for convenience in placing the view on the sheet.

Figure 1:
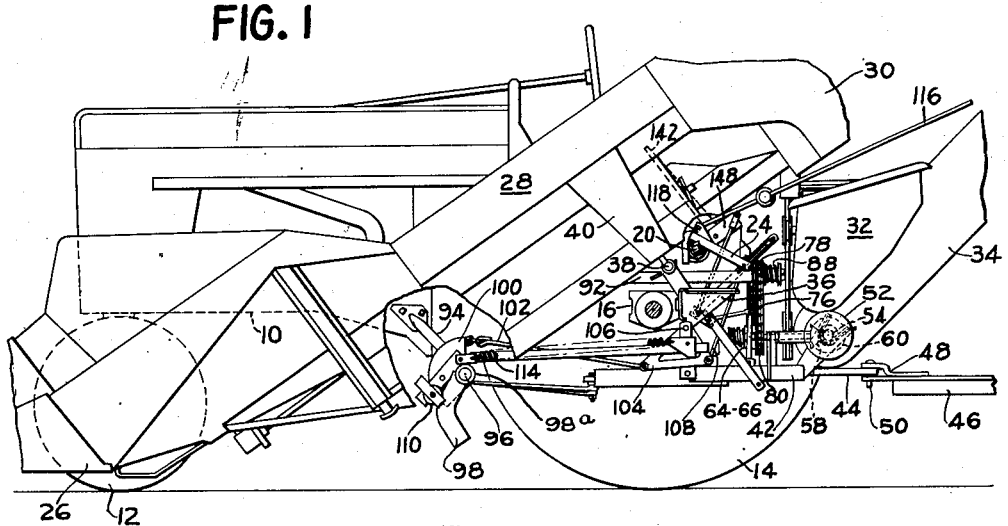

As suggested above, the invention may be utilized in conjunction with tractor-drawn or tractor-carried harvesting machinery. That illustrated is of the tractor-carried type. The tractor chosen for the purposes of illustration is largely conventional and to that extent comprises a longitudinal body 10 carried on front and rear wheels 12 and 14. The rear portion of the body includes transverse axle structure 16 and also includes a power lift unit of the type shown in the U. S. patent to Jirsa 2,532,552. In this case, the power control unit is contained in a housing 18 which may be considered part of the tractor body 10.

The housing 18 carries therein a transverse rockshaft 20 under control of a fluid motor so that it may be selectively rocked in clockwise or counterclockwise directions. The fluid motor is not shown, since the details of the power unit per se are not important.

The rockshaft 20 has rigidly secured to the right-hand end thereof (Figure 5) a power-operated member 22. A similar member 24 is secured to the left-hand end of the rockshaft. Thus, the members 24 and 22 constitute bi-directionally movable and settable power-operated members that are primarily useful in adjusting implements associated with the tractor.

The harvester illustrated here is one of the many implements that may be adjusted by power means such as that described. The illustrated harvester is a corn picker and comprises a forwardly disposed gathering unit 26 and a rearwardly and upwardly inclined husking unit 28. The details of the picker structure are immaterial and reference may be had to any one of several patents disclosing these details. Fundamentally, what happens is that the gathering unit 26 is carried by the mobile frame represented by the tractor and functions to gather ears of corn, for example, from standing stalks. These ears are transferred upwardly to the husking unit 28 and are moved thence upwardly for discharge through a discharge hood 30 to drop into a hopper 32 associated with a wagon elevator 34 carried at the rear of the tractor by supporting structure to be presently described.

The rear axle structure 16 of the tractor has rigidly affixed thereto a mounting bracket means 36 which includes a pivot 38 on a transverse horizontal axis. A support 40 rigid with the husking unit 28 provides a cooperating pivot so that the harvester 26—28 is carried by the tractor for vertical adjustment about the pivot 38.

The bracket or mounting structure 36 may further include a rearwardly extending support 42 by means of which the tractor carries the wagon elevator 34. For all practical purposes, the wagon elevator may be considered a unitary part of the support 42. In any event, the details are not important here.

The support 42 is illustrated as having a rearwardly extending drawbar 44 to which is connected a tongue or draft member of a towed wagon (not shown). The connection between the wagon tongue 46 and the drawbar member 44 is conventionally effected by a clevis 48 and a vertical pivot pin 50. The patent to Karlsson 2,533,814 may be taken as representative of a harvester in which a tractor-mounted corn picker is associated with a trailing wagon. The patent to Andrews et al. 2,494,080 may be taken as representative of a tractor-drawn corn picker associated with a trailing wagon. In any event, the problems are the same and no distinction should be drawn between the two types of machines.

Figure 4:
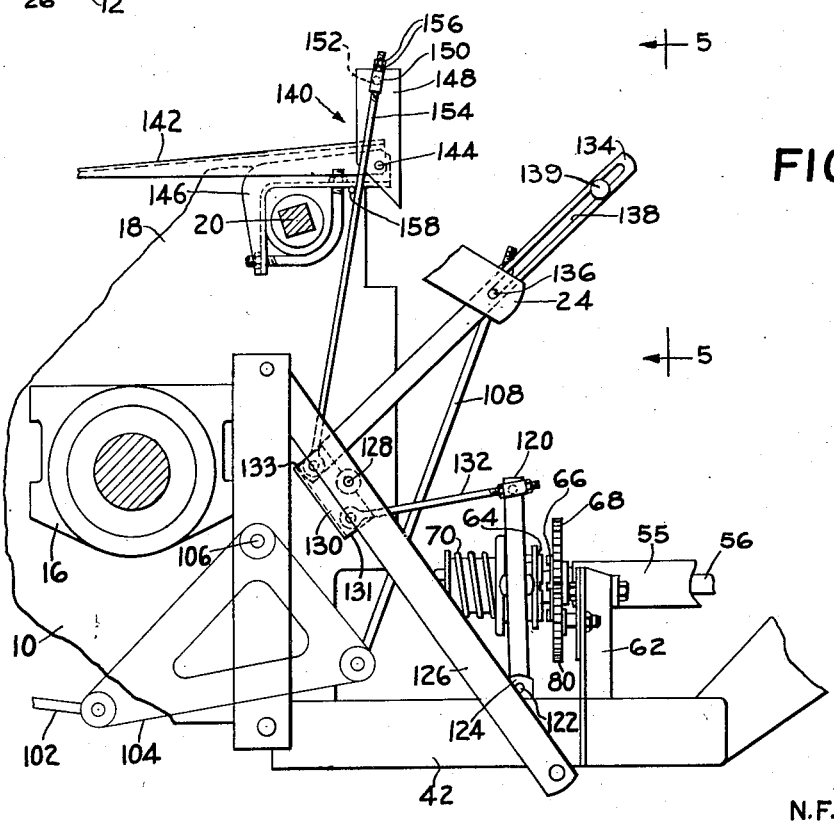
Figure 4 is a similar view, also partly in section, showing the positions that the parts will occupy when the picking unit is lowered but the manually operated means is set so as to retain the wagon elevator clutch in its disengaged position.
Figure 2:
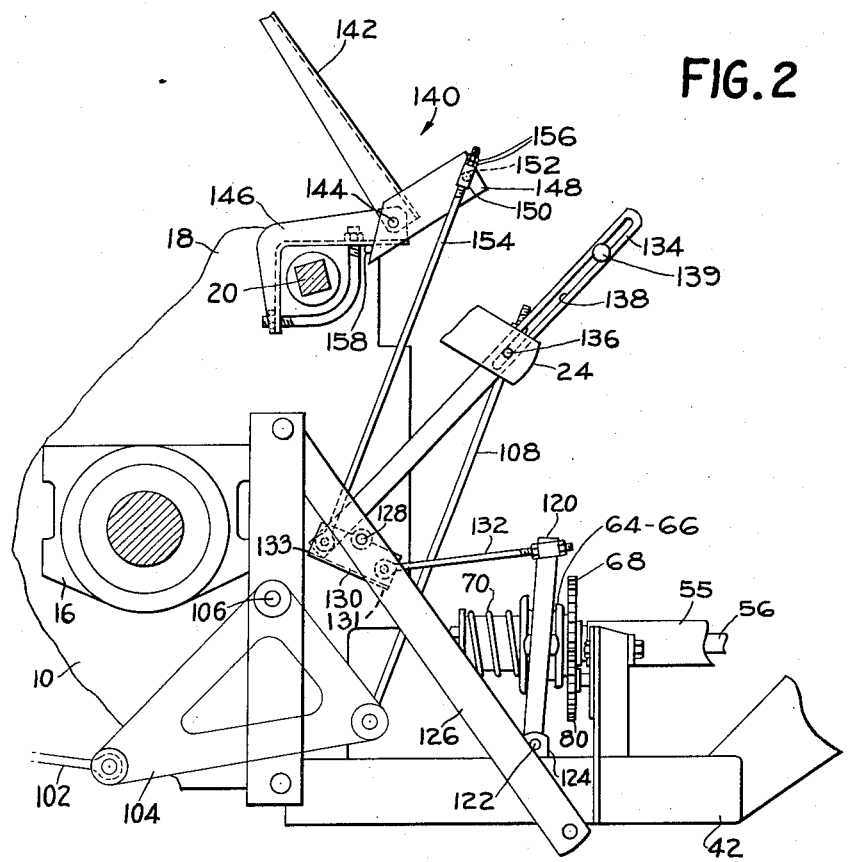
Figure 2 is an enlarged fragmentary view, partly in section, showing the positions of the control means components when the wagon elevator clutch is engaged.
Figure 3:
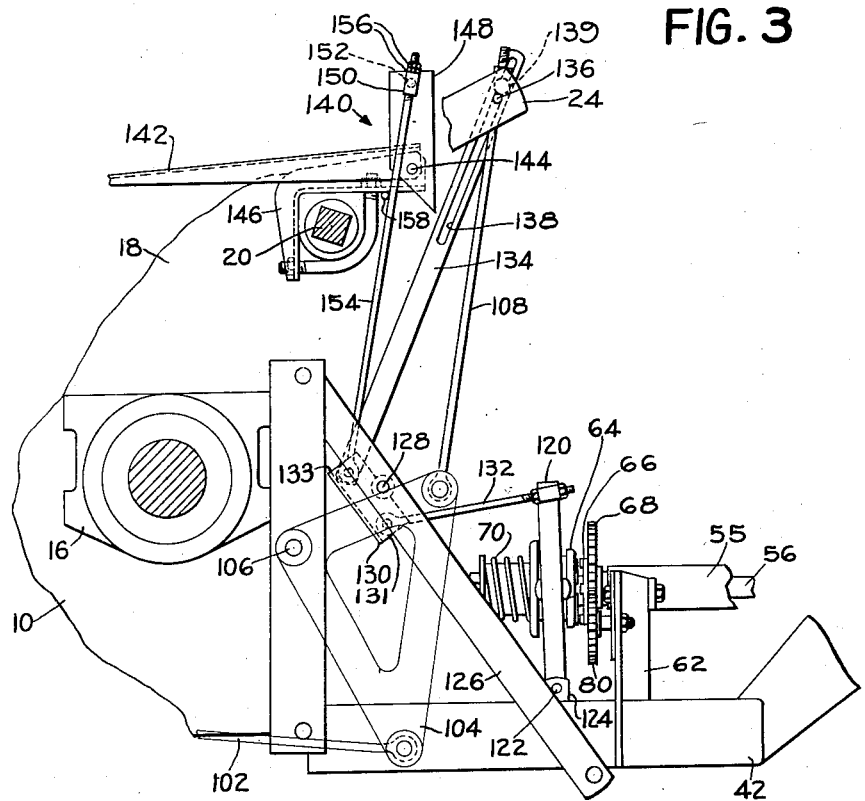
Figure 3 is a similar view, also partly in section, showing the parts in the positions they will occupy when the picking unit is raised and the manually operated means is set to maintain disengagement of the wagon elevator clutch.

In the present instance, the wagon elevator 34 is shown as having at its lower or boot end a gear housing 52 in which is journaled a transverse shaft 54 for driving the conventional flights (not shown) in the elevator. The gear housing 52 includes a forwardly extending housing portion 55 within which is journaled a longitudinal driving shaft 56 (Figures 2, 3 and 4). The shaft 56 has keyed to its rear end a bevel pinion 58 which is in constant mesh with a bevel gear 60 keyed to the transverse elevator shaft 54 (Figure 1). The forward end of the housing portion 55 that journals the shaft 56 is suitably carried by a support 62 on the wagon elevator support 42. The forward end of the shaft 56 carries thereon for rotation therewith but for axial shifting relative thereto a driven clutch part 64. This part is selectively engageable with or disengageable from a driving clutch part 66. The clutch part 66 is a unitary part of a sprocket 68 journaled on the shaft 56. Engagement of the clutch 64—66 is normally maintained by means of biasing means such as a coiled compression spring 70.

The tractor is conventionally equipped with a centrally disposed, rearwardly extending power take-off shaft 72 (Figure 6) to which is keyed a double driving sprocket 74. A driving chain 76 is trained about the power take-off sprocket 74, about a picker driving sprocket 78, and about a wagon elevator idler sprocket 80, one run of the chain passing over the clutch driving sprocket 68. A second driving chain 82 connects the power take-off sprocket 74 with a picker-driving sprocket 84 at the other side of the tractor. An idler 86 is associated with the second chain 82.

Figure 6:
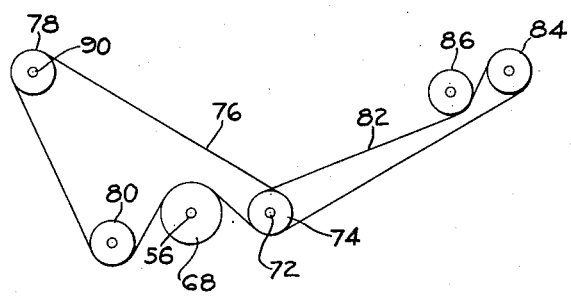
Figure 6 is a schematic view showing the driving arrangement from the tractor power take-off shaft.

The picker-driving sprocket 78 is associated with a slip clutch 88 (Figure 1) on a picker input shaft 90 (Figure 6). The shaft 90 is carried in a forwardly extending support 92 (Figure 1) and the forward end of the input shaft may be associated with any conventional mechanism for driving the gathering means. A similar arrangement may be found at the opposite side of the tractor as is the case in a two-row tractor-mounted picker. These details are unimportant except to the extent that they form a background for the explanation of the invention.

Figure 5:
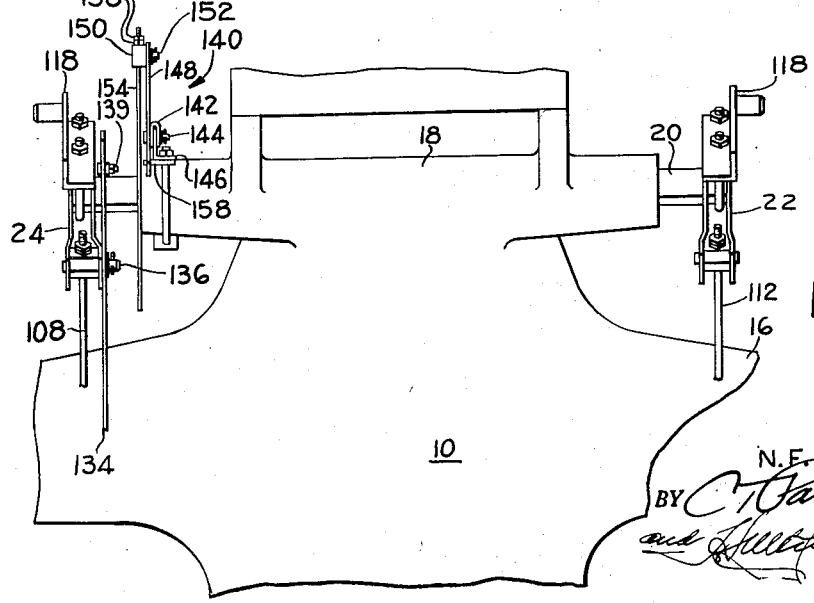
Figure 5 is a fragmentary rear elevational view as seen substantially along the line 5—5 of Figure 4.

The tractor body 10 is provided intermediate its front and rear ends with a supporting structure 94 in which is included a transverse pivot shaft 96. An adjusting or lifting arm 98 is rigid on a sleeve 98ª rockable on the shaft 96, as is a lifting sector 100. This sector is connected by a lifting link 102 to one arm of a bell crank 104. The bell crank is pivoted at 106 on the supporting structure 36 and the other arm of the bell crank is connected by a link 108 to the power-operated member 24 that was previously described as being secured to the left-hand end of the power unit rockshaft 20. Thus it will be seen that rocking of the rockshaft 20 in a counter-clockwise direction as viewed in Figures 2, 3 or 4 results in rocking of the bell crank 104 also in a counter-clockwise direction to effect rocking of the lift means 98—100 in a clockwise direction. The lift arm 98 engages a roller 110 carried in any suitable manner on the gathering unit 26. Consequently, the picker 26—28 is raised or adjusted about the transverse pivot axis 38. The picker lowers by reason of its own weight, incurring clockwise rocking of both the bell crank 104 and the member 24. Thus, both of these members are movable incident to adjustment of the picker and either may be selected to transmit force to control the clutch 64—66 as will presently appear. Similar lifting means may be provided at the opposite side of the tractor in the case of a two-row machine. Figure 5 shows a lifting link 112 similar to the lift link 108. For the purposes of the present invention, it is immaterial whether the picker is a one- or two-row type.

Adjustment of the picker about the pivot axis 38 by the power means just described is facilitated by the use of one or more counterbalancing springs, such as that designated by the numeral 114 in Figure 1.

In the particular design of the wagon elevator mounting shown here, the gear housing 52 provides a pivot on a transverse axis for the wagon elevator 34 relative to the wagon elevator support 42. The upper end of the wagon elevator is braced by one or more tension rods 116 that are connected at their lower ends to short arms 118 associated with the power lift unit in the housing 18. As shown in Figure 1, one short arm 118 may be secured to the power-operated member 24. A similar arm (Figure 5) may be associated with the right-hand power-operated member 22 to accommodate a second link (not shown) similar to that described at 116. Accordingly, as the picker is raised and lowered about its pivot 38, the wagon elevator 34 will be slightly raised and lowered about its pivot at 54. Again, these details are unimportant and are described only in connection with the specific picker illustrated.

It was stated above that the clutch 64—66 is normally engaged by the biasing means 70. Disengagement of the clutch may be effected by a control member 120 pivoted at its lower end at 122 to a lug 124 on the wagon elevator support 42. The wagon elevator support is braced to the tractor rear axle by a forwardly and upwardly inclining brace 126. This brace has near its upper end a pivot 128 on a transverse axis on which is mounted a clutch-actuating member 130. This member is a lever in the form of a bell crank having one arm 131 connected by a rod or link 132 to the upper end of the clutch control member 120. The other arm 133 of the bell crank member 130 is connected by force-transmitting means in the form of a link 134 to the power-operated member 24. A stud 136 effects the last-mentioned connection, and the link 134 is slotted at 138 to provide a lost-motion device or one-way force-transmitting connection for purposes to be presently described. An adjustable stop means 139, such as a bolt and nut assembly, is selectively settable in the slot to determine the extent of the lost motion.

The second arm of the bell crank member or clutch-actuating member 130 is connected also to manual control means designated generally by the numeral 140. This means comprises a manually operated lever member in the form of a tractor-borne pedal element 142 pivoted at 144 on a suitable bracket 146 carried by the left-hand side of the power unit housing 18. The pedal 142 includes a rigid part 148 so that the two parts 142 and 148 comprise a bell crank pivoted at the pivot 144 already described. A sleeve 150 pivoted to the part 148 on a transverse pivot axis at 152 slidably carries the upper end of a second force-transmitting or link means in the form of a rod 154, the lower end of which is pivotally connected to the second arm of the bell crank member 130. Stop means in the form of a pair of adjustable nuts 156 cooperates between the upper threaded end of the rod 154 and the rod-carrying sleeve 150 to limit movement of the rod 154 relative to the part 148 to one direction only.

The bracket 146 is equipped with a stop 158 to engage a portion of the part 148 as best shown in Figure 2.

The length of the pedal 142 is sufficient to cause the pedal to tend to move to the positions of Figures 3 and 4. Hence, it may be said that the pedal is biased to this position. Further, this position may be considered a lock position, for reasons to be pointed out below.

It will be noted in general that the clutch-actuating member or bell crank 130 is connected in parallel to the power-operated member 24 and to the manually operated means 140, the force-transmitting means 108 and 154 respectively accomplishing this result. The slot 138 in association with the stud 136 on the power-operated member 24 comprises a lost-motion device, as previously described, to accommodate selective operation of the clutch 64—66 by the two control means.

When the machine is operating as in Figure 1 to gather corn from the field and to cause the corn to be delivered to the wagon elevator hopper 32 and thence to the elevator 34, the gathering unit 26 is in a lowered position. The clutch 64—66 is engaged so that the elevator 34 will deliver to the trailing wagon. As long as the picker unit is in its lowered or gathering position, the power-operated arm will be in its down or unit-lowering position as shown in Figure 2. The clutch spring 70 will maintain engagement between the clutch parts 64 and 66. The operator will have lifted the pedal 142 to its position of Figure 2, which is such that the link 154 is to the rear (or to the right as viewed in the drawings) of the pivot 144. Thus, the over-center relationship as shown in Figure 4 is changed to the over-center relationship as shown in Figure 2. Accordingly, the manually operated means 140 may be considered to be moved from its lock to its release position.

When the operator reaches the end of a row or otherwise maneuvers the machine so that a relatively sharp turn is negotiated, which would cause misalinement of the wagon elevator and wagon, he will actuate the power unit 18 so as to cause the power-operated member 24 to move upwardly or in its unit-raising direction to the position of Figure 3. During the first portion of the upward travel of the member 24, the stud 136 moves idly in the slot 138 in the link 134. However, the stud 136 ultimately engages the stop means 139 adjacent to the upper end of the slot 138 (Figure 3) and causes rocking of the bell crank member 130 in a clockwise direction to draw on the link 132 so that the clutch part 64 is separated from the clutch part 66. Because of the tendency of the pedal 142 to return to its position of Figure 3, it does just that and the link 154 moves ahead of the pivot 144 so that the pedal 142 is in its lock position. Thus, the pedal and its connecting linkage comprises selective means optionally effective to automatically retain the clutch in its disengaged position or to release the clutch for biased re-engagement.

Assuming that the operator actuated the power-operated member to raise the gathering unit at the end of a row so that he could make a turn, and that he has completed the turn and is driving the picker down an adjacent row or rows, he will actuate the power means to lower the gathering unit as soon as the unit is centered on its row. Accordingly, the power-operated member 24 will move downwardly or in its unit-lowering direction. However, because of the over-all length of the machine, the wagon will not have completed its turn and therefore may not be properly alined with the discharge end of the wagon elevator. Therefore, it is desired to delay reengagement of the wagon elevator clutch 64—66. This result is accomplished here because of the one-way connection or lost-motion in the link 134 as afforded by the slot 138. Consequently, the member 24 may move downwardly to the position of Figure 4, the stud 136 moving downwardly in the slot 138. Since the over-center position of the pedal 142 operates through the link 154 to retain the Figure 3 position of the bell crank 130, the clutch will not reengage. As soon as the operator sees that the wagon is trailing properly, he may, by hand or by hooking the toe of his shoe under the pedal 142, raise the pedal to its position of Figure 2 and the parts, thus released, will then be in their operating position, with the clutch 64—66 reengaged.

It is also possible with the control means herein disclosed to effect manual disengagement of the clutch irrespective of the down or lowered position of the power-operated member 24. That is to say, the operator may depress the pedal 142, moving it from the position of Figure 2 to that of Figure 4. As will be seen in Figure 2, there is sufficient length of slot 138 below the stud 136 so that the movement just described may be accomplished. Accordingly, the clutch may be selectively disengaged by either power or manual effort. The pedal 142 may, of course, be released from the position of Figure 4 and restored to the position of Figure 2 without any action on the part of the power-operated member 24.

The slidability of the rod 154 in the sleeve 150 on the pedal part 148, together with the adjustability of the lock nuts 156, enables the manual control 140 to be accurately adjusted. The nuts 156 may also be turned down on the rod 154 so as to decrease the distance between 130 and 148 to such extent that the pedal 142 cannot move to its Fig. 4 position, thus providing means for disabling the automatic retention of the clutch in its disengaged position, whereby the clutch will become disengaged and engaged respectively substantially simultaneously with raising and lowering of the crop-gathering unit. Since the components just described establish a one-way connection between the link 154 and the pedal part 148, it follows that the link 154 may move upwardly relative to the manual control means in the event that the control means is for some reason or another prevented from moving forwardly to its position of Figure 4. For example, should the operator happen to have his foot in the path of the descending pedal 142, the lost-motion arrangement just described would prevent what might be a serious injury. Hence, the arrangement incorporates a safety device.

Because of the simplicity of the device, it may be readily incorporated into existing machines or may be just as readily furnished as original equipment on newly manufactured machines. In any event, the fundamentals are the same and the invention as defined herein embraces both.

Various other features of the invention in addition to those specifically enumerated here will undoubtedly occur to those versed in the art, as will numerous modifications and alterations, all of which may be achieved without departing from the spirit and scope of the invention.

What is claimed is:

1. In a harvester having a mobile frame, a crop-gathering unit connected thereto for adjustment between raised and lowered positions and including a member movable as an incident to such adjustment, and a conveyor connected to the frame and positioned to receive crops from the unit and having drive means including a clutch biased into engagement and a movable clutch part: the improvement comprising: a one-way force-transmitting connection between the movable clutch part and the movable member for disengaging the clutch only upon raising of the unit; selectively releasable and lockable means connected to the clutch and automatically lockable to retain the clutch disengaged upon raising of the unit, said one-way force-transmitting means enabling lowering of the unit with the clutch so retained, and said selective means being releasable to enable biased re-engagement of the clutch after lowering of the unit; and control means separate from the unit and movable member and connected to the movable clutch part for moving the clutch part to disengage the clutch, said one-way force-transmitting connection enabling operation of said control means while the unit is in its lowered position.

2. The invention defined in claim 1, including: means interconnecting the control means and the selective means for effectuating retention and release of the clutch upon operation of the control means.

3. In a harvester having a mobile frame, a crop-gathering unit connected thereto for adjustment between raised and lowered positions and including a member movable as an incident to such adjustment, and a conveyor connected to the frame and positioned to receive crops from the unit and having drive means including a clutch biased into engagement and a movable clutch part: the improvement comprising: a one-way force-transmitting connection between the movable clutch part and the movable member for disengaging the clutch only upon raising of the unit; selectively releasable and lockable means connected to the clutch and automatically lockable to retain the clutch disengaged upon raising of the unit, said one-way force-transmitting means enabling lowering of the unit with the clutch so retained, and said selective means being releasable to enable biased re-engagement of the clutch after lowering of the unit; and means connected to the selective means for optionally disabling said selective means as to its automatic retention of the disengaged clutch so that the clutch is disengageable and engageable respectively substantially simultaneously with raising and lowering of the crop-gathering unit.

4. In a harvester having a mobile frame, a crop-gathering unit connected thereto for adjustment between raised and lowered positions and including a member movable as an incident to such adjustment, and a conveyor connected to the frame and positioned to receive crops from the unit and having drive means including a clutch biased into engagement: the improvement comprising: a one-way force-transmitting connection between the clutch and the movable member for disengaging the clutch only upon raising of the unit; a lever member fulcrumed on the frame and biased for movement from a first position to a second position; link means connected to the lever member and deriving force from disengagement of the clutch to move the lever member from its first position to its second position; locking means associated with the lever member for automatically and releasably locking it in its second position to retain disengagement of the clutch, said one-way force-transmitting means enabling lowering of the unit with the clutch so retained, and said locking means being releasable to enable biased reengagement of the clutch after lowering of the unit; and control means separate from the unit and movable member and connected to the clutch for disengaging the clutch, said one-way force-transmitting connection enabling operation of said control means while the unit is in its lowered position.

5. The invention defined in claim 4, in which: the locking means is effected by such relationship between the link means and the fulcrum of the lever member that said lever member in moving from its first position to its second position moves past a dead-center position and thus retains the clutch in its disengaged condition.

6. In a tractor-mounted harvester having a crop-gathering unit mounted for adjustment between raised and lowered positions, a drawbar on the tractor, a member on the tractor above the drawbar and movable incident to adjustment of the unit, and a conveyor on the drawbar including drive means having a clutch below the movable member and biased into engagement: the improvement comprising a lever rockable on the drawbar intermediate the movable member and the clutch and having first and second arms; link means connecting the first arm to the clutch; one-way force-transmitting means connecting the second arm to the movable member for rocking of the lever to disengage the clutch only upon movement of the member incident to raising of the unit; and releasable retaining means connected to the tractor and to the second arm of the lever and automatically lockable to retain the lever against return rocking under action of the clutch bias when the member moves incident to lowering of the unit, such movement of the member being permitted because of said one-way force-transmitting means; and said releasable retaining means being subsequently releasable to enable return rocking of the lever and re-engagement of the clutch after the unit is lowered.

7. The invention defined in claim 6, in which: the one-way force-transmitting means comprises a link having a slot and pin riding in the slot and connected to the movable member; and an adjustable stop is carried by the link and selectively settable along the slot for engagement by the pin.

8. In a tractor-mounted harvester having a crop-gathering unit mounted for adjustment between raised and lowered positions, a drawbar on the tractor, a member on the tractor above the drawbar and movable incident to adjustment of the unit, and a conveyor on the drawbar including drive means having a clutch below the movable member and biased into engagement: the improvement comprising a lever rockable on the drawbar intermediate the movable member and the clutch and having first and second arms; link means connecting the first arm to the clutch; one-way force-transmitting means connecting the second arm to the movable member for rocking of the lever to disengage the clutch only upon movement of the member incident to raising of the unit; and separate control means independent of the unit and movable member and including a tractor-borne movable element and a force-transmitting connection between said element and the second arm of the lever, said element being movable from a first position to a second position for rocking said lever to disengage the clutch in the absence of movement of the movable member.

9. The invention defined in claim 6, including: releasable retaining means associated with the tractor-borne element and automatically effective to lock said element in its second position and thereby to retain the disengaged condition of the clutch.

References Cited in the file of this patent

UNITED STATES PATENTS

| 2,325,870 | Mott | Aug. 3, 1943 |
| 2,527,823 | Karlsson et al. | Oct. 31, 1950 |
| 2,536,899 | Andrews et al. | Jan. 2, 1951 |
| 2,544,911 | Aasland | Mar. 13, 1951 |